May 10, 1966  M. D. TUPPER ETAL  3,250,579
BEARING AND SHAFT LUBRICATION ARRANGEMENT
Filed Jan. 2, 1964  2 Sheets-Sheet 2
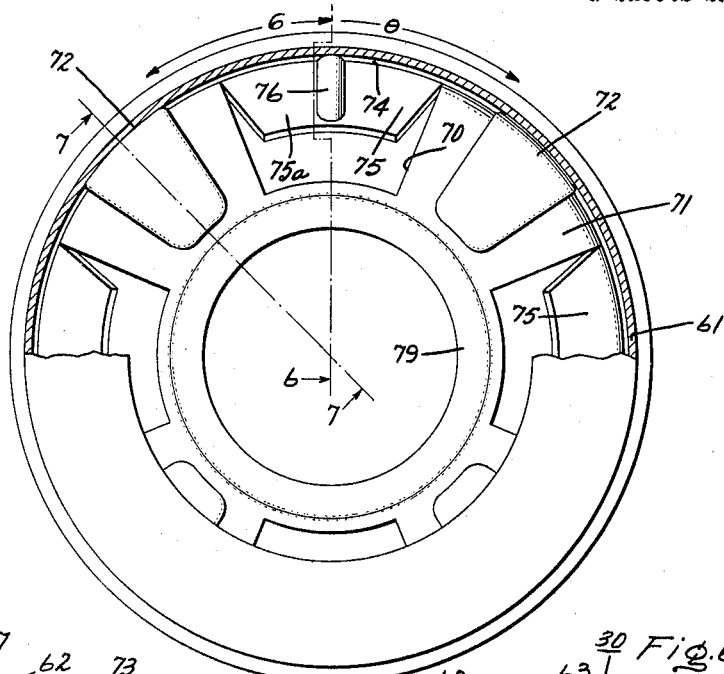
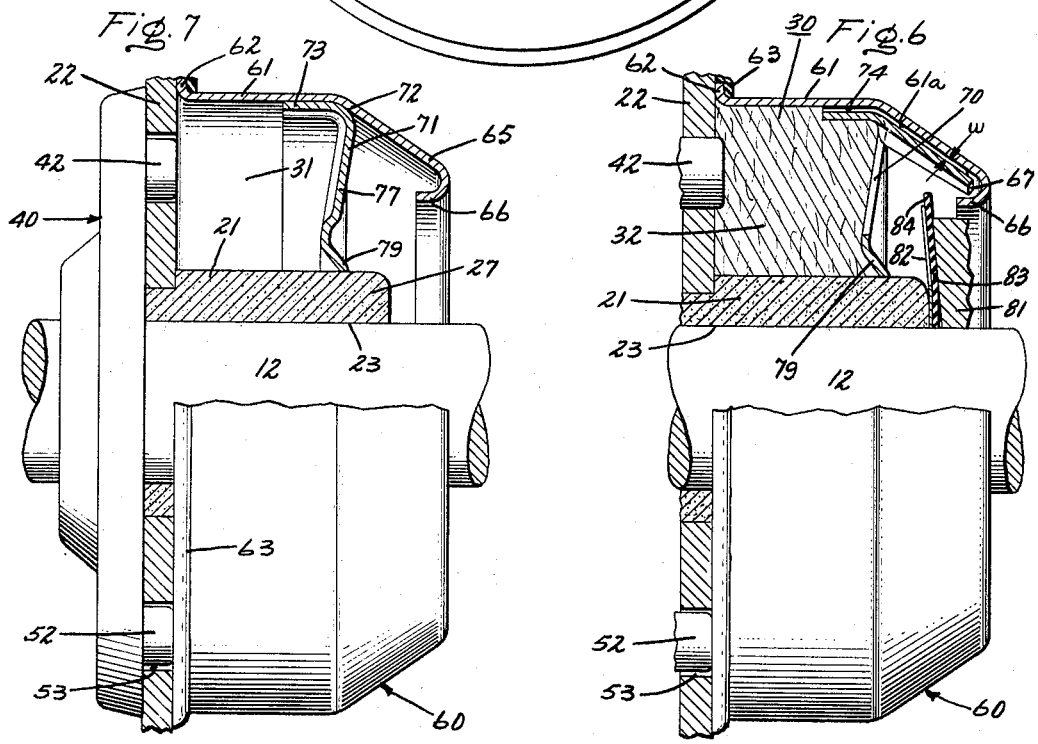
Inventors:
Myron D. Tupper,
Richard W. Dochterman,
by John M. Stoudt
Their Attorney.

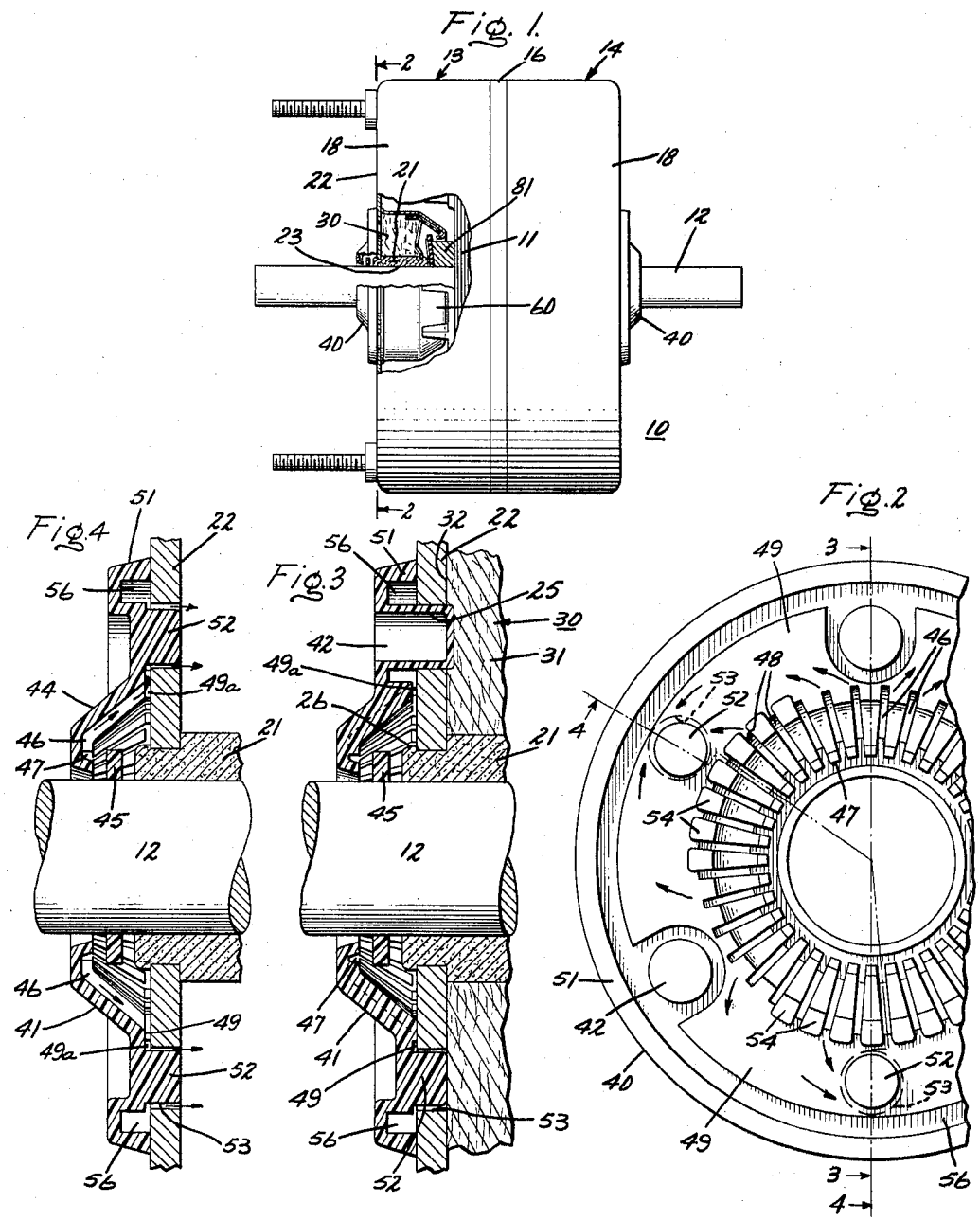

United States Patent Office 3,250,579
Patented May 10, 1966

3,250,579
BEARING AND SHAFT LUBRICATION ARRANGEMENT
Myron D. Tupper and Richard W. Dochterman, both of Fort Wayne, Ind., assignors to General Electric Company, a corporation of New York
Filed Jan. 2, 1964, Ser. No. 335,268
9 Claims. (Cl. 308—127)

This invention relates in general to bearing and shaft lubrication arrangements, and more particularly, to dynamoelectric machine bearing lubrication recirculation arrangements in which lubricant is returned to a lubricant holding reservoir.

In small equipment having shafts rotatably journaled by sleeve-type bearings, such as small and fractional horsepower electric motors, the provision of adequate lubrication to the journal surfaces is extremely important, especially for those applications in which the motors are mounted in relatively inaccessible locations and are required to operate for long periods of time without supervision. Therefore, it is customary to furnish a lubricant reservoir surrounding the bearing in which absorbent fibrous material retains the lubricant until it is gradually fed or transferred from this reservoir to the journal surfaces by a wick or other suitable means during operation of the equipment.

In an effort to conserve lubricant and to prevent lubricant from escaping from the bearing journal and be thrown by centrifugal action toward the motor interior where it may come into contact with and possibly break down certain electrical components of the motor; e.g., windings, a so-called lubrication recirculation system may be provided. This system usually includes a lubricant slinger or oil thrower attached to rotate with the shaft adjacent at least the inboard end of the bearing and an oil recapturing-sump which surrounds, but is spaced outwardly from the slinger. The sump incorporates a ring of fiberous lubricant absorbent material, such as a felt wick, for collecting excess lubricant thrown outwardly by the slinger and for returning the lubricant by capillary action to the reservoir for reuse.

While this approach does have a tendency to conserve lubricant, it unfortunately has not been entirely satisfactory in the past and is deficient in certain respects. For example, the absorbent material exposed to the shaft has a tendency to deposit fibers onto the shaft surface, which may interfere with the proper rotation of the shaft when the fibers come between the shaft and bearing. Noise may also be produced as the fibers travel along the surface of the shaft and make contact with other components of the motor. Singeing of the exposed fibers has not satisfactorily solved this problem. Then, too, the system does not provide a controlled lubricant transfer from the lubricant-catching sump to the reservoir. The sump must approach saturation conditions before it begins to function in returning the lubricant to the reservoir and the transfer is accomplished in a random or erratic fashion. Also, in the past, for motors incorporating end frames or end shields formed from stamped out sheet material, relatively complex and expensive constructions were required to provide both a recirculation lubrication system and a rigid mount for both ends of the sleeve-type bearing. This problem was greatly magnified when a lubricant return path was employed at both ends of the bearing.

It is, therefore, a general object of the present invention to provide an improved bearing and shaft lubrication arrangement and a more specific object is the provision of such arrangement for a dynamoelectric machine which overcomes the difficulties and deficiencies mentioned above.

Another object of this invention is the provision of an improved bearing lubrication recirculation system which is low in cost, yet furnishes a controlled return of excess lubricant from the bearing ends to a lubricant reservoir for reuse.

Yet another object of the invention is the provision of a dynamoelectric machine lubrication recirculation system which is low in cost, is easily installed, is rugged in construction, includes relatively few parts, requires less space for a given excessive lubricant return capacity, and is particularly suitable for use with a supporting wall formed of sheet metal.

A still further object of the invention is the provision of an improved sleeve bearing and shaft lubrication recirculation system which not only returns lubricant to a reservoir from at least one of the bearing ends, but also serves in supporting the associated end of the bearing.

In carrying out the objects in one form, we provide an improved return arrangement at each end of a dynamoelectric machine sleeve type bearing for returning excess lubricant from the bearing ends to a lubricant holding reservoir. At the outboard end of the bearing, a single piece cap is attached to the outside surface of the wall supporting the outboard end of the bearing and together with the supporting wall, forms a capillary return path to the lubricant reservoir. The path is defined by a number of angularly spaced apart capillary clearances such as capillary grooves formed on the inner surface of the cap disposed toward the bearing which in turn communicate with capillary passageways formed between the cap and the supporting wall. These passageways open into the reservoir. In operation, the grooves capture excess lubricant directed radially outward from the shaft and transfer it to the passageways which convey it back to the reservoir for reuse, the transfer of lubricant being accomplished by a controlled capillary path.

At the inboard end of the bearing, the components which produce a controlled capillary return path to the reservoir also cooperate to form the cavity of the reservoir and serve to support the inboard end of the bearing. A cup shaped cap, mounted to the inside of the previously mentioned supporting wall, extends beyond that associated bearing end. Within and mounted to the cap is a section or plate which has a radial wall carrying the inboard end of the bearing. The inner surface of the supporting wall, the cap, outer surface of the bearing, and plate together form the reservoir cavity. The radial wall of the plate is cut at angularly spaced locations to form ears which are bent away from the reservoir toward the cap. These ears and the inner surface of the cap form a capillary clearance in communication with the reservoir and serve to recapture lubricant lost from the inboard end of the bearing. These clearances also return the lubricant by controlled capillary attraction back to the reservoir for reuse.

This construction is not only inexpensive to manufacture and install but like the outboard structure also produces controlled capillary return of lubricant regardless of the angle at which the machine may be mounted.

The subject matter which we regard as our invention is particularly pointed out and distinctly claimed in the concluding portion of this specification. Our invention, itself, however, both as to organization and method of operation, together with further objects and advantages thereof may best be understood by reference to the following description taken in connection with the accompanying drawings.

In the drawings:

FIG. 1 is a side view, partially broken away and partially in cross section of a dynamoelectric machine incorporating one form of the present invention;

FIG. 2 is an enlarged fragmentary view of the outboard lubricant return seen in FIG. 1, the view taken along line 2—2 in FIG. 1;

FIG. 3 is a view taken along line 3—3 in FIG. 2;

FIG. 4 is a view taken along line 4—4;

FIG. 5 is an enlarged end view of the inboard lubricant return, bearing support and lubricant reservoir forming assembly seen in FIG. 1, with the assembly being partially broken away to show details;

FIG. 6 is a view taken along line 6—6 in FIG. 5; and

FIG. 7 is a view taken along line 7—7 in FIG. 5 with the lubricant absorbent material of the reservoir removed to show details.

Referring now to the drawings in more detail and in particular to FIG. 1, one form of the invention has been illustrated in connection with a small or fractional horsepower dynamoelectric machine, more specifically, a small electric motor, indicated generally by numeral 10, having a double shaft extension. The motor has a stator of standard construction (not shown) and a rotor 11 suitably secured to a rotatable rotor shaft 12. The stator and rotor are mounted within a frame for relative rotation which is formed by a pair of end shield assemblies 14 and 15. The stator and end shield assemblies may be rigidly secured together by any suitable means, as by welding each assembly to the periphery of the stator shown at 16. A number of axially extending bolts 17, attached to end shield assembly 13, may be employed to mount the motor onto a stationary support (not shown).

For reasons of simplicity of illustration and brevity of description, only one shield 13 has been shown in detail, but it is understood that if desired, both assemblies may be identically constructed. In the illustrated form assembly 13 is formed by a generally cup-shaped member 18, stamped out of sheet metal material such as steel or the like, and carries a sleeve-type bearing 21 centrally on radial wall 22 of the member. This bearing may be formed of permeable sintered material providing a smooth axially extending innerbore 23 for journaling one end of the rotor shaft 12. One end of the bearing is fastened to and supported by end shield member 18 by any suitable means, such as by initially forming the end with an outer diameter of reduced size, projecting the end through an accommodating opening 25 furnished in wall 22, and then bending over or staking the end against the outer surface of wall 22, adjacent the opening, in the manner indicated at 26.

In the exemplification of the illustrated motor, the improved lubricating recirculation system, constructed in accordance with one form of the present invention, is shown in detail in connection with end shield 13. This system has a lubricant reservoir, generally identified by numeral 30, which surrounds bearing 21 and outboard and inboard capillary returns 40 and 60 respectively in communication with reservoir 30 for reclaiming and returning excess lubricant to the reservoir from the ends of the bearing.

The outboard capillary return 40, best illustrated by FIGS. 2, 3, and 4 will be considered first. In its preferred form return 40 includes an end cap 41 surrounding the outboard end of bearing 21. The cap may be fabricated from any suitable material, such as molded resilient thermoplastic (e.g., glass filled nylon) and as illustrated is mounted to the outer surface of wall 22 by three equally spaced apart hollow studs 42 which project through complementary, though slightly smaller, openings 25 stamped into end shield wall 22. In view of the resilient property of cap 41 and the hollow nature of the studs, the studs tend to deform slightly upon insertion into the openings, snapping into place to create an interference type fit between the interengaging parts.

Centrally of cap 41 is a frusto-conical flanged section 44 which is in space relation to and encircles a resilient washer 45 fastened to rotate with shaft 12 as by an interference fit. The washer is arranged adjacent the outboard end of the bearing and functions as an oil slinger.

The inner surface of section 44, disposed toward the shaft, includes a number of angularly spaced apart and generally inclining capillary grooves 46 extending radially upward and axially inward from an annular groove 47. The lower wall of groove 47 is sufficiently close to the periphery of shaft 12 to form a seal therewith. The upper ends of capillary grooves 46 terminate, as indicated by numeral 48, at a radial wall 49 disposed in closely spaced relation to the outer surface of end frame wall 22 of the motor. The axial dimension of this space, shown at 49a in FIGS. 2 and 3, is small enough to establish capillary attraction of lubrication between adjacent walls 49 and 22. Angularly intermediate the studs 42 and radially outward from terminations 48, the radial wall 49 carries solid, integral projections 52 which extend axially through apertures stamped into end frame wall 22 and form eccentric, axial passageways 53 having a minimum dimension located toward the axis of the shaft. The outer periphery or rim 51 of cap 41 is in sealing engagement with the outer surface of wall 22, radially outward from studs 42 and projections 52, and along with a number of integral raised portions 54 provided on wall 49, create the desired axial dimension across space 49a. Portions 54 are preferably located in the vicinity of projections 52, away from studs 42, where they will not interfere with the transfer of lubricant from grooves 46 to the passageways 53.

With the foregoing construction, the capillary path will return excess lubricant from the outboard end of the bearing to the reservoir in the manner indicated by the arrows in FIGS. 2 and 4. In particular excess lubricant accumulated at the outboard end of the bearing 21 will be directed outwardly by washer 45 in the direction of capillary grooves 46 and annular groove 47 which recapture the lubricant and transfer it to the radial space 49a. The lubricant is then conveyed by capillary attraction to the eccentric axial passageways 53 and finally into the lubricant reservoir for reuse.

In order to establish a positive capillary flow toward reservoir 30, the capillary path should gradually decrease in capillary size from a maximum dimension at annular groove 47 to a minimum dimension at passageways 53. In actual practice, completely satisfactory results have been achieved by forming annular groove 47 with the nominal radial width of .025 inch, grooves 46 with a width of .015 inch; space 49a—.010 inch; and the minimum dimension of .005 inch for passageways 53. These are all nominal measurements.

Between rim 51 of cap 41 and the outermost region of wall 49, above the part of wall 49 which is in axial alignment with the uppermost portion of passageways 53, a circular recess or channel 56 is provided in the manner best illustrated by FIG. 2. This channel, which also surrounds studs 42, is greater in radial width than that required to produce capillary attraction for lubricant transfer, that is, above .06 inch. Consequently, channel 56 is in effect a barrier to the capillary flow of lubricant beyond the confines of wall 49 and passageways 53 toward rim 51, therefore insuring a sealed relation between cap 41 and the end frame at rim 51.

Of course, for single shaft output extension motor applications in which the shaft does not extend far beyond the outboard end of the bearing on the side of the motor opposite the shaft output extension, the radial area surrounded by annular groove 47 of the illustrated end cap 41 may be closed or made imperforate. In other words, section 44 may include a solid central radial wall made integral therewith. A cap having this structure, including the illustrated outboard capillary return path back to the reservoir, prevents pressure build-up at this location which might occur with the use of conventional seals. Such pressure could result from lubricant pumping action during motor operation.

With respect to the inboard side 60 of the system, it will be observed from an inspection of FIGS. 5, 6 and 7 that the components which define the inboard side of bearing 21 within the motor frame also serve both as a capillary path for returning excess lubricant from that end of the bearing to reservoir 30 and as a rigid support for the associated bearing end. In the illustrated form, a generally cup-shaped member or enlarged cap 61, is secured to the inner surface of wall, radially beyond studs 42 and passageways 53, by any convenient means; e.g., integral annular flange 62 and hardened adhesive epoxy resin 63 applied entirely around flange 62 to bond cap 61 to wall 22. This connection should, of course, be such as to create a seal between wall 22 and member 61. Member 61 extends inwardly toward the motor interior, terminating in a frusto-conical flanged section 65 which extends beyond inboard bearing end 27. A lip 66, at the end of member 61 remote from wall 22, bent axially back toward wall 22, forms an enlarged opening through which shaft 12 projects. On the side of lip 66 remote from the shaft, section 65 defines in effect an annular clearance or groove 67.

A section or plate 71, also stamped out of sheet material, fits within member 61, and along with the outer periphery of bearing 21, wall 22, and a part of the inner surface of member 61, defines a lubricant reservoir cavity 31 (FIG. 7). In this cavity is arranged suitable lubricant retaining means, such as a cylindrical oil impregnated felt pad 32 (FIG. 6), which is capable of feeding lubricant, as required, to the permeable bearing. In the illustrated embodiment, lubricant is transferred through the body of the bearing by capillary action to bore 23. Thus, if a pad is used, it must have a region of contact with the permeable bearing of the exemplification. Plate 71 is mounted to member 61 by merely bending over the rim of the plate and forming radially raised or protruding portions 72 (FIG. 7) in it at angularly spaced apart locations 73 to furnish an interfering fit with the inner surface of member 61. The circumferential length of the rim between adjacent locations 73, identified as angle $\theta$ in FIG. 5, is spaced from the inner surface of member 61 to define a capillary passageway 74 into the outermost regions of reservoir 30, best seen in FIGS. 5 and 6. A plurality of angularly spaced ears 75, each having a central positioning rib 76 of preselected height and an angular length less than $\theta$, are struck from the side wall 77 of plate 71, with their free edges 75a being inclined away from the wall 77.

It is desirable to turn edges 75a sufficiently high so that when mounting plate 71 within member 61 prior to its connection to wall 22, member 61 will firmly engage ribs 76 to force the ears down toward the shaft with a spring type fit. In this way the ribs will always control the dimension across the clearance, or width "$w$" of the space indicated by numeral 61a in FIG. 6, which is formed between the inner wall of member 61 and the outer surface of the ears 75. In particular, the radial dimension across this space establishes a capillary clearance which connects annular groove 67 with capillary passageways 74. Consequently, excess lubricant directed outwardly from inboard end 27 will be captured by annular groove 67 and clearances 61a and returned to the reservoir for reuse through passageways 74.

In order to have the capillary return path just described at the inboard end of the bearing function properly for motors to be mounted at any one of a number of angles, its is important that the reservoir holding means; e.g., pad 32, produce a capillary force or attraction capable of pulling lubricant from passageways 74 at all angles. In actual practice, it has been found, for example, that a satisfactory return 60 made in accordance with the illustrated embodiment may incorporate pad 32 having a low density in the order of two pounds per square yard for a pad ¼ inch in thickness. Satisfactory passageways 74 and clearances 61a when used in combination with the pad of the example, were within the range of .005 to .025 inch. However, the actual dimensional limits for a given application will be dependent upon many factors, such as surface tension, weight of oil, angle of setting, and the total column of the oil which must be lifted. It is not intended, therefore, that the present invention be limited to the example given above.

Another feature of the plate 71 and member 61 is the rigid support they furnish for the inboard end 27 of the bearing. As illustrated, wall 77 of plate 71 includes a radially inner slightly bowed section 79 having a circular edge arranged in frictional engagement to produce a pressure fit with the outer surface of bearing 21, adjacent inboard end 27. During assembly of section 79 over the bearing when plate 71 and member 61 are being installed onto wall 22, section 79 springs slightly over end 27 to permit the assembly.

The thrust bearing and slinger arrangement shown in FIG. 6 and the manner in which they cooperate with the components already referred to will now be considered. From an inspection of that figure and FIG. 1, it will be seen that the inboard end of bearing 21 functions as a stationary thrust surface for receiving the axial thrust of the rotor. A hub 81 is cast about the end of rotor 21 and projects to a point within member 61. Between bearing end 27 and an extremity 82 of the hub which is inclined toward the axis of the shaft and the rotor, are positioned a thrust transmitting spring 83 and an oil slinger 84. Spring 83 is of the star type disclosed in the Myron D. Tupper Patent 3,038,765 issued June 12, 1962. With reference to slinger 84, it is in effect a resilient washer made of rubber or the like being somewhat larger in diameter than the diameter of the opening defined by lip 66. The slinger may be assembled in the illustrated operative position of FIGS. 1 and 6 merely by deforming it temporarily and sliding it into position. This slinger must be soft enough so that during operation when it is rotatably driven by the hub and shaft, it in turn drives the star spring by an embedding action in which the axial force transmitted from hub 81 to the bearing through the spring and the resilient slinger tends to embed the spring into the side of the slinger. Further, as the slinger and spring rotate as a unit with the rotor, the slinger forms a seal with lip 66 to prevent oil vapor from entering into the interior of the motor and throws oil outwardly toward clearances 61a. Both the spring and slinger may also direct some oil toward the openings 70 in wall 77 of plate 71 from which ears 75 were removed (see FIGS. 5 and 6). In addition, the slinger will have a shielding effect on the bearing, tending to reduce the temperature of the bearing caused by heat flow from the rotor.

Consequently, it will be appreciated from the foregoing that the present invention provides an improved yet low cost relatively simple arrangement for returning lubricant escaping from the ends of a bearing to a lubricant holding reservoir for reuse. Further, by the present invention, the excess lubricant is satisfactorily recaptured and transferred to the reservoir in a controlled fashion, regardless of the angle at which the motor is mounted. Moreover, the arrangement at the inboard end of the bearing also serves to support that end in a rigid manner. The system is formed of inexpensive components at each end of the bearing which are readily assembled together.

It should also be recognized from the above description that the inboard and outboard components of the illustrated system have utility apart from one another and may, if desired, be employed without the other.

While in accordance with the patent statutes, we have described what at present is considered to be the preferred embodiment of our invention, it will be obvious to those skilled in the art that numerous changes and modifications may be made therein without departing from the invention and it is therefore aimed in the appended claims to cover all such equivalent variations as fall within the true spirit and scope of the invention.

What we claim as new and desire to secure by Letters Patent of the United States is:

1. For use in a dynamoelectric machine, a lubricant recirculation arrangement comprising a frame wall supporting one end of a sleeve type bearing, a member having one end secured to said frame wall and surrounding said bearing in spaced relation thereto; lubricant holding means arranged within the cavity defined by said member and the outer surface of said bearing to form a lubricant reservoir; a plate positioned in said member and secured thereto at a number of spaced apart connection locations, said plate having regions disposed adjacent and in spaced relation to said member to form capillary clearances therewith intermediate said plate connection locations for recapturing lubricant lost from the other bearing end; capillary passageways connecting said clearances with said lubricant reservoir; a single piece cap mounted to said frame wall on the side remote from said reservoir; said cap having an outer rim in engagement with said frame wall, said cap further including a central flanged section surrounding said one bearing end and extending away from said frame wall; the inner surface of said flanged section including a plurality of angularly spaced apart capillary grooves for recapturing lubricant lost from said one bearing end; and capillary passageways connecting each of said grooves to said reservoir, whereby recaptured lubricant lost from both ends of said bearing is returned by controlled capillary transfer to said reservoir for reuse.

2. For use in a dynamoelectric machine, a lubricant recirculation arrangement comprising a frame wall supporting one end of a sleeve type bearing, a cup shaped member having one end secured to said frame wall and surrounding said bearing in spaced relation thereto; a generally disc shaped plate disposed in said member and connected at its outer regions to said member at a number of angularly spaced apart locations; said plate having means supporting the other end of said bearing; lubricant holding means forming a lubricant reservoir arranged within the cavity defined by said frame wall, said plate and the outer surface of said bearing; said plate having a number of ears disposed adjacent and in spaced relation to an inner surface of said member forming capillary clearances therewith intermediate said plate connection locations for recapturing lubricant lost from said other bearing end; and capillary passageways connecting said clearances with said lubricant reservoir; a single-piece molded cap mounted to said frame wall on the side remote from said reservoir; said cap having an outer rim in sealing engagement with said frame wall and a side surface spaced slightly from a portion of said frame wall to provide a capillary clearance therebetween; said cap further including a central flanged section surrounding said one bearing end and extending away from said side surface, the inner surface of said flanged section including a plurality of angularly spaced apart capillary grooves for recapturing lubricant lost from said one bearing end; said grooves having their ends terminating at said capillary clearance for transferring the recaptured lubricant to the clearance, capillary connecting means between said clearance and the reservoir, and an enlarged channel encircling said side surface for preventing the capillary transfer of lubricant toward said rim; whereby recaptured lubricant at both ends of said bearing is returned by controlled capillary transfer to said reservoir for reuse.

3. In a dynamoelectric machine, a frame wall supporting one end of a sleeve type bearing having a bore; a member having one end secured to said frame wall and surrounding said bearing in spaced relation thereto; lubricant holding means forming a lubricant reservoir radially outward from the bearing bore; means disposed within said member having spaced apart regions disposed adjacent and in spaced relation to inner surfaces of said member forming capillary clearances therewith for recapturing lubricant lost from the other bearing end; capillary means connecting said clearances with said lubricant reservoir; a cap mounted to said frame wall on the side remote from said reservoir; said cap including a central flanged section surrounding said one bearing end and extending away from said end frame; the inner surface of said flanged section including a plurality of angularly spaced apart capillary grooves exposed to said bearing end for recapturing lubricant lost from said one bearing end; and capillary means connecting each of said grooves to said reservoir whereby lubricant lost from both ends of said bearing is recaptured and returned by capillary transfer to said reservoir for reuse.

4. In a dynamoelectric machine having a lubricant reservoir, a frame supporting a sleeve type bearing, a cap mounted to said frame and having a section surrounding in spaced relation one end of said bearing, said section including longitudinal capillary clearances exposed toward said bearing end for recapturing lubricant lost from said end, and capillary transfer means connecting said clearances on at least one end thereof with the reservoir whereby lubricant recaptured by said clearances is returned by capillary transfer to the reservoir for reuse.

5. In a dynamoelectric machine having a lubricant reservoir, a frame wall supporting at least one end of a sleeve type bearing, and means mounted to said frame surrounding said end for returning excess lubricant lost from said end to the reservoir, said means comprising a cap having a central flanged section surrounding one of said bearing ends and extending away from said frame wall, the inner surface of said flanged section including a plurality of angularly spaced apart capillary grooves exposed to said bearing end and joined together at one end by an annular capillary groove for recapturing lubricant lost from the associated bearing end, capillary means connecting the other end of each groove to the reservoir, said capillary means returning the recaptured lubricant from said grooves to the reservoir for reuse.

6. In a dynamoelectric machine having a lubricant reservoir, a frame wall supporting at least the outboard end of a sleeve type bearing, and means mounted to said frame surrounding said end for returning excess lubricant lost from said outboard end to the reservoir, said means comprising a single-piece molded cap having an outer rim arranged adjacent said frame wall, and a central flanged section surrounding the outboard bearing end, the inner surface of said flanged section including a plurality of angularly spaced apart capillary grooves for recapturing lubricant lost from the outboard bearing end, capillary means connecting each groove to the reservoir, said capillary means returning the recaptured lubricant from said grooves to the reservoir for reuse.

7. In a dynamoelectric machine having a lubricant reservoir, a frame wall supporting at least the outboard end of a sleeve type bearing, and means mounted to said frame surrounding said end for returning excess lubricant lost from said outboard end to the reservoir, said means comprising a single-piece molded cap having an outer rim in engagement with said end frame and a side surface spaced slightly from a portion of said frame wall to provide a capillary clearance therebetween; a central flanged section surrounding the outboard bearing end and extending away from said side surface; the inner surface of said flanged section including a plurality of angularly spaced apart capillary grooves for recapturing lubricant lost from the outboard bearing end; said grooves having their ends terminating at said capillary clearance for transferring the recaptured lubricant to the clearance; an enlarged channel encircling said side surface for preventing the capillary transfer of lubricant toward said rim beyond said side surface; said connecting means returning the transferred lubricant from said clearance to the reservoir.

8. In a dynamoelectric machine, a frame wall supporting one end of a sleeve type bearing having a bore; cap member having one end secured to said frame wall and surrounding said bearing in spaced relation thereto; lubricant holding means forming a lubricant reservoir radially outwardly from the bearing bore; a plate arranged adjacent the other end of said bearing and connected as its outer regions to said cap member at a number of angularly spaced apart locations, said plate having other regions disposed adjacent and in spaced relation to said cap member forming capillary clearances therewith intermediate said plate connection locations for recapturing lubricant lost from said other bearing end; and capillary passageways connecting each clearance with said lubricant reservoir, whereby said clearances and passageways return the recaptured lubricant to said reservoir for reuse.

9. In a dynamoelectric machine, a frame wall supporting one end of a sleeve type bearing; a cup shaped cap member having one end secured to said frame wall and surrounding said bearing in spaced relation thereto; a generally disc shaped plate arranged within said cap member adjacent the other end of the bearing, said plate being in engagement at its outer regions with an inner surface of said cap member at a number of angularly spaced apart locations and having means supporting the other end of said bearing; lubricant holding means forming a lubricant reservoir arranged within the cavity defined by said frame wall, plate, and the outer surface of said bearing, said plate having a number of ears disposed adjacent and in spaced relation to the inner surface of said cap member forming capillary clearances therewith intermediate the engagement locations for recapturing lubricant lost from said other bearing end; and capillary passageways connecting each clearance with said lubricant reservoir, whereby said clearances and passageways return the recaptured lubricant by controlled capillary transfer to said reservoir for reuse.

References Cited by the Examiner

UNITED STATES PATENTS

| | | | |
|---|---|---|---|
| 2,688,521 | 9/1954 | Annen | 308—187.2 |
| 2,800,373 | 7/1957 | Kablick et al. | 308—121 |

DAVID J. WILLIAMOWSKY, *Primary Examiner.*

FRANK SUSKO, *Examiner.*